United States Patent
Edwards, IV

(10) Patent No.: US 11,339,909 B2
(45) Date of Patent: May 24, 2022

(54) PIPELINE PROTECTION AND LEVELING DEVICE

(71) Applicant: Allan John Edwards, IV, Tulsa, OK (US)

(72) Inventor: Allan John Edwards, IV, Tulsa, OK (US)

(*) Notice: Subject to any disclaimer, the term of this patent is extended or adjusted under 35 U.S.C. 154(b) by 225 days.

(21) Appl. No.: 16/517,825

(22) Filed: Jul. 22, 2019

(65) Prior Publication Data

US 2020/0041061 A1 Feb. 6, 2020

Related U.S. Application Data

(60) Provisional application No. 62/712,484, filed on Jul. 31, 2018.

(51) Int. Cl.
| | |
|---|---|
| *F16L 57/06* | (2006.01) |
| *F16L 1/235* | (2006.01) |
| *F16L 1/20* | (2006.01) |
| *F16L 1/11* | (2006.01) |

(52) U.S. Cl.
CPC ............. *F16L 57/06* (2013.01); *F16L 1/11* (2013.01); *F16L 1/207* (2013.01); *F16L 1/235* (2013.01)

(58) Field of Classification Search
CPC ... F16L 1/207; F16L 1/11; F16L 1/235; F16L 1/06; F16L 3/02
See application file for complete search history.

(56) References Cited

U.S. PATENT DOCUMENTS

| | | | |
|---|---|---|---|
| 3,503,788 A | 3/1970 | Franklin et al. | |
| 3,734,138 A | 5/1973 | Brown et al. | |
| 4,197,033 A | 4/1980 | Gendron | |
| 4,420,275 A * | 12/1983 | Ruser | E02B 3/08 405/15 |
| 6,502,333 B1 | 1/2003 | Striegel | |
| 7,074,305 B2 | 7/2006 | Connors | |
| D532,574 S | 11/2006 | Clark et al. | |
| 8,262,320 B2 | 9/2012 | Gunn et al. | |
| 8,360,688 B2 * | 1/2013 | Gunn | F16L 1/24 405/184.4 |
| 8,888,406 B2 | 11/2014 | Keaton et al. | |
| 2002/0090265 A1 * | 7/2002 | Merten | E02B 3/127 405/18 |
| 2010/0108825 A1 | 5/2010 | Brock | |
| 2012/0003049 A1 * | 1/2012 | Sprague | F16L 1/24 405/184.4 |
| 2014/0255104 A1 * | 9/2014 | Connors | F16L 1/06 405/184.4 |
| 2015/0086273 A1 | 3/2015 | Forse | |
| 2018/0112801 A1 | 4/2018 | Cybulski et al. | |

FOREIGN PATENT DOCUMENTS

| | | | |
|---|---|---|---|
| DE | 10202186 | | 3/2003 |
| GB | 2131909 | * | 6/1984 |

* cited by examiner

*Primary Examiner* — Sean D Andrish
(74) *Attorney, Agent, or Firm* — Head, Johnson, Kachigian & Wilkinson, PC

(57) ABSTRACT

A pipeline protection and leveling device for an underground pipeline. The device includes a permeable housing structure having a left side, a right side, a bottom and an open top. An excavator hook lift strap, an upright lift strap, and at least one side lift strap each extend from the permeable housing structure. A top opening closure mechanism is configured to close the open top.

5 Claims, 8 Drawing Sheets

PIPELINE PROTECTION AND LEVELING DEVICE

CROSS REFERENCE

This application is based on and claims priority to U.S. Provisional Patent Application No. 62/712,484, filed Jul. 31, 2018, which is incorporated herein in its entirety by reference.

BACKGROUND OF THE INVENTION

Field of the Invention

This invention relates generally to a device providing protection and leveling of pipelines installed underground in order to protect them from elements that would be harmful to the pipelines over time.

DESCRIPTION OF THE RELATED ART

Pipeline transportation is important in delivery and gathering of various liquids and gases. It is estimated that there are more than 2 million miles of pipeline in the world.

Pipelines may be located above ground, underground, or underwater, such as on a seabed.

Pipelines placed underground are at risk of being harmed from the harsh underground ecosystem that exists naturally. These harms include rocks, water erosion, and the like.

Based on the foregoing, it is desirable to provide a pipeline protective padding device for underground pipelines that is easily maneuvered and controlled in the field and could be easily transported by existing machinery in the field.

During the installation process, tubular pipeline strings or lengths are brought to the field. A trench or other opening is prepared. The trench may also be shored. Thereafter, the pipeline strings or lengths are lowered into the trench. The pipeline strings or lengths are joined together, such as by welding, and the trench is then covered.

Accordingly, it would be desirable to provide a pipeline protective padding and leveling device that provides multiple options to lifting and lowering.

It would also be desirable to provide a pipeline protective padding and leveling device that provides an easy leveling system during installation of an underground pipeline.

SUMMARY OF THE INVENTION

The present invention is directed to a pipeline protection and leveling device for an underground pipeline comprising: a permeable housing structure, that is substantially oval in cross-section, having a left side and a right side, a top and a bottom, wherein said top has an opening; at least one excavator hook lift strap; at least one upright lift strap; at least one side lift strap; and a top opening closure mechanism to close said opening in said top including a pair of straps configured to tie together to close said top opening where the pair of tying straps closes the top opening of the permeable housing structure by securing the top in place after the top of the permeable housing structure is rolled up.

A second part of the present invention is directed to a pipeline protection and leveling process comprising the steps of: filling a permeable housing structure, that is substantially oval in cross-section, having a left side, a right side, a bottom and an open top with filling particles through said open top; closing said open top with a top opening closure mechanism by tying a pair of straps together to close said open top, where the pair of tying straps closes the top opening of the permeable housing structure by securing the top in place after the top of the permeable housing structure is rolled up; lifting said permeable housing structure and thereafter lowering said housing structure into a trench with a lifting mechanism connected to an upright strap, a side strap or an excavator hook strap attached to the housing structure; resting a pipeline section on said permeable housing structure.

DETAILED DESCRIPTION OF THE INVENTION

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

Figure 1:
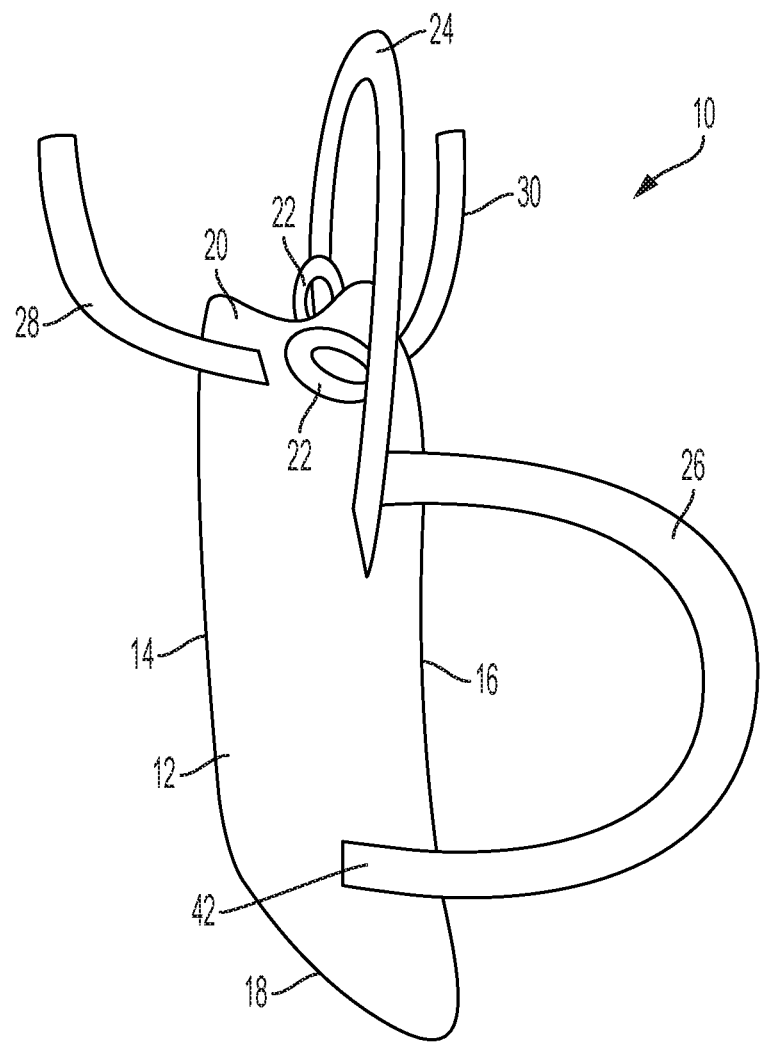
FIG. 1 is a perspective view of a pipeline protection and leveling device for an underground pipeline constructed in accordance with the present invention.

Referring to the drawings in detail, FIG. 1 illustrates a perspective view of a pipeline protection and leveling device 10 for an underground pipeline. The device 10 includes a flexible permeable housing structure 12. In one embodiment, the permeable housing structure 12 is fabricated from woven polypropylene or other woven plastic material. Other materials may be used within the spirit and scope of the invention.

The permeable housing structure 12 includes a left side 14 and an opposed right side 16, a bottom 18 and an opposed open top 20. In one configuration, the permeable housing structure 12 is substantially oval or pillow-shaped in cross-section.

The housing structure 12 is substantially closed with the exception of the open top 20. The housing structure 12 will be filled from the open top. The housing structure is permeable and, in particular, is moisture-permeable and water-permeable. Accordingly, the housing structure 12 will retain fill material but allow moisture and water to pass therethrough.

Extending from the permeable housing structure 12 is at least one hook lift strap 22. In a preferred embodiment, two hook straps 22 are employed. The hook lift straps are positioned adjacent either the left side 14 or the right side 16 near the open top 20 of the permeable housing structure 12. The hook lift straps 22 may be fabricated from synthetic material in the form of a web and may be sewn or otherwise securely affixed to the housing structure 12. The hook lift straps 22 may be utilized to engage a hook or like on an excavator, tractor, or other lift and transport mechanism. Alternatively, the hook lift straps 22 may engage hooks on a filling frame 50.

Figure 3:
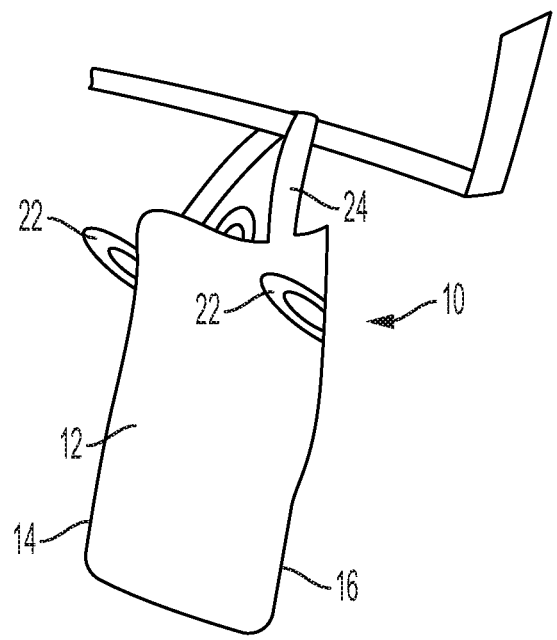
FIG. 3 illustrates a perspective view of the device as shown in FIG. 1 after filling and after closure of the open top during lifting, transportation and lowering.
Figure 5:
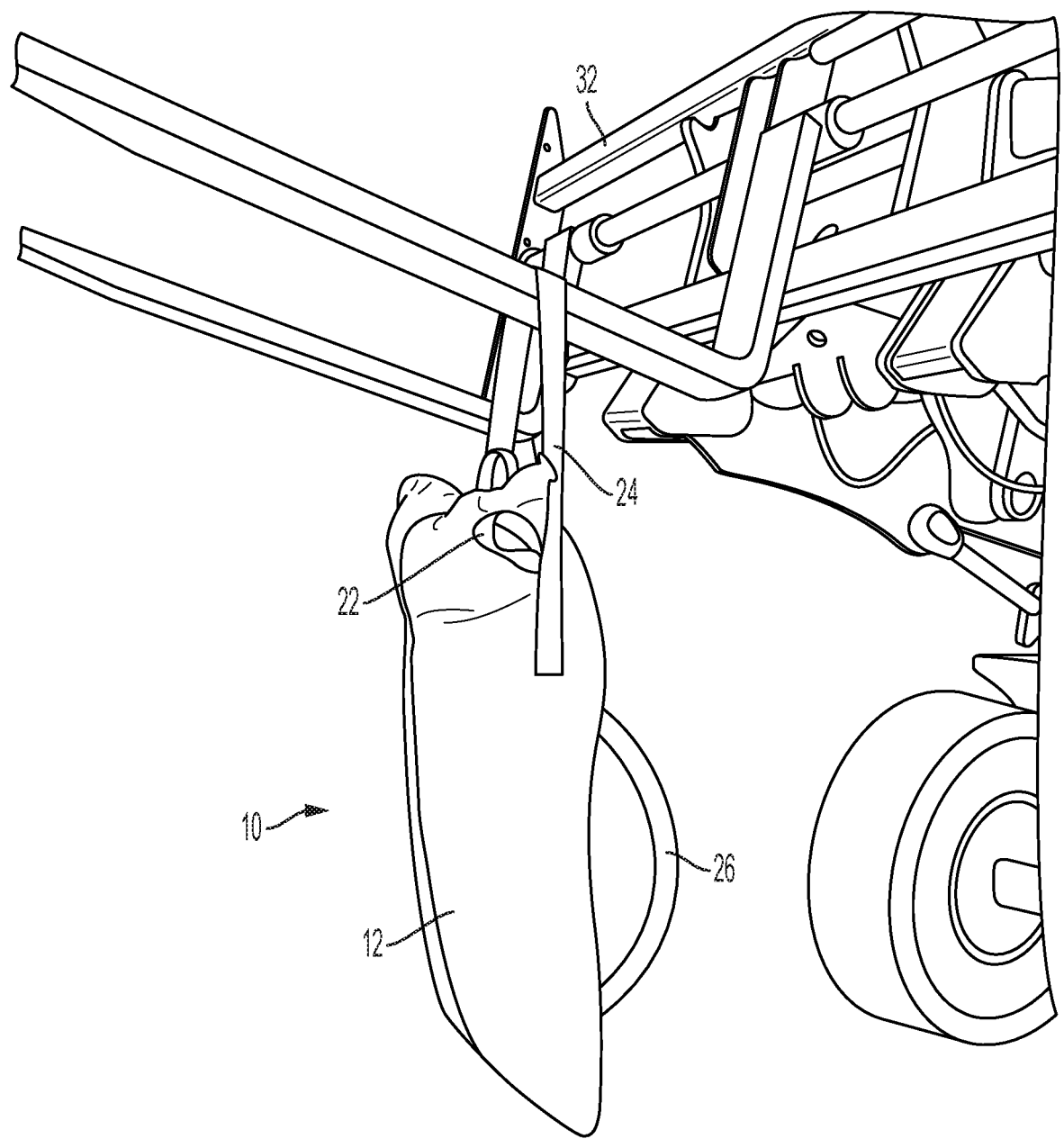
FIG. 5 illustrates a perspective view of the device shown during lifting, transportation and lowering.

An upright or vertical lift strap 24 extends vertically from the permeable housing structure 12 near the open top 20 of the permeable housing structure 12. The upright or vertical lift strap 24 may be fabricated from a synthetic woven web material and may be sewn or otherwise securely affixed to the housing structure 12. As best seen in FIG. 3 and FIG. 5, the upright lift strap 24 may be utilized to engage an excavator, tractor or other lift and transport mechanism. The upright lift strap 24 may be used during the filling of the housing structure 12 and during lifting and transportation of the device 10.

A side or horizontal lift strap 26 is positioned horizontally perpendicular from the right side or the left side of the permeable housing structure 12. The side lift strap 26 may be fabricated from a synthetic web material and may be sewn or otherwise securely affixed to the housing structure 12.

The device 10 includes a top opening closure mechanism in order to close the open top 20. In use, the permeable housing structure 12 will be loaded with filling particles, such as sand, dirt, pebbles, or the like. Thereafter, the top opening 20 will be closed. A top opening closure mechanism includes a pair of closure straps 28 and 30 that may be closed in two alternate ways. In a first procedure, after filling, the top will be rolled up and tucked in on itself to close the top. The pair of straps will then be tied together. Alternatively, after filling, the top will be gathered together in the center and tied.

Figure 2:
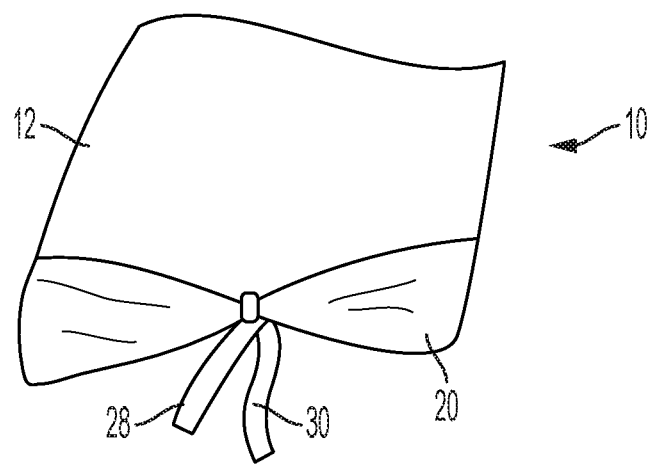
FIG. 2 illustrates a perspective view of a portion of the device shown in FIG. 1 with the top closure mechanism completed in order to close the open top after filling.

FIG. 2 illustrates a perspective view of a portion of the device 10 with the closure mechanism completed. The pair of straps 28 and 30 are shown tied together to close the open top 20 after filling.

Figure 4:
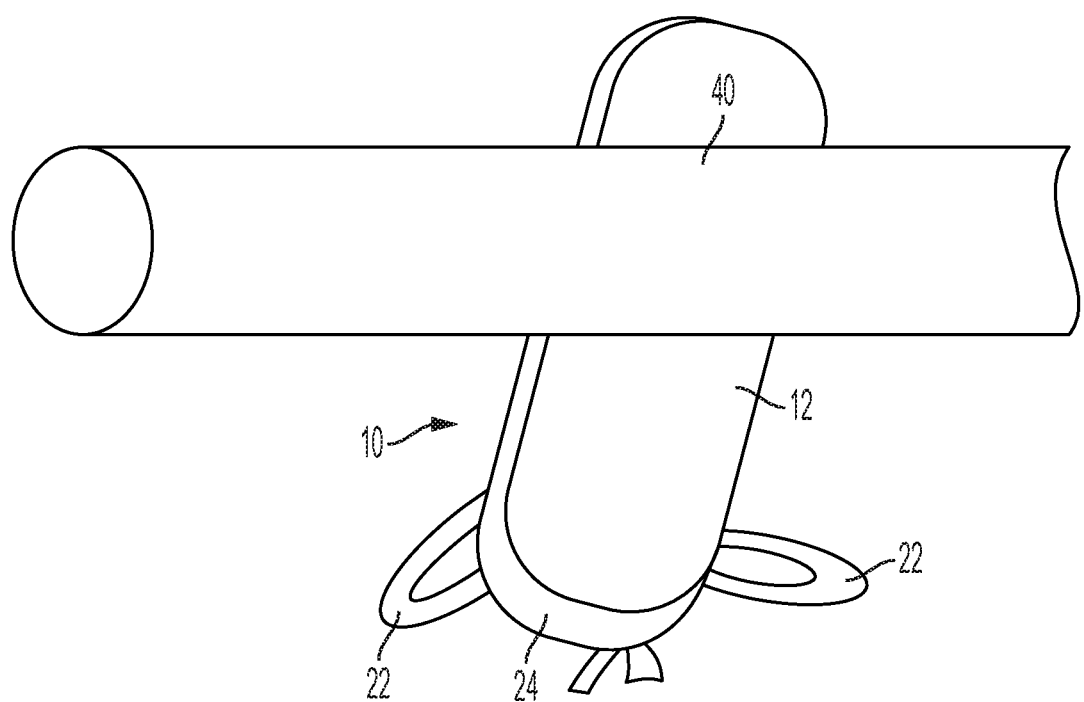
FIG. 4 illustrates a top view of the device after transportation and lowering into a trench and after placement of a pipeline thereon.

FIG. 4 illustrates a top view of the device 10 after being transported to a trench and lowered into the trench. A pipeline section 40 is shown after being lowered onto the device 10 inside of the trench to protect the pipeline and level the pipeline in the trench.

FIG. 5 illustrates the device 10 after filling and after closure of the top during transportation by a tractor 32 to be installed in a trench.

Figure 6:
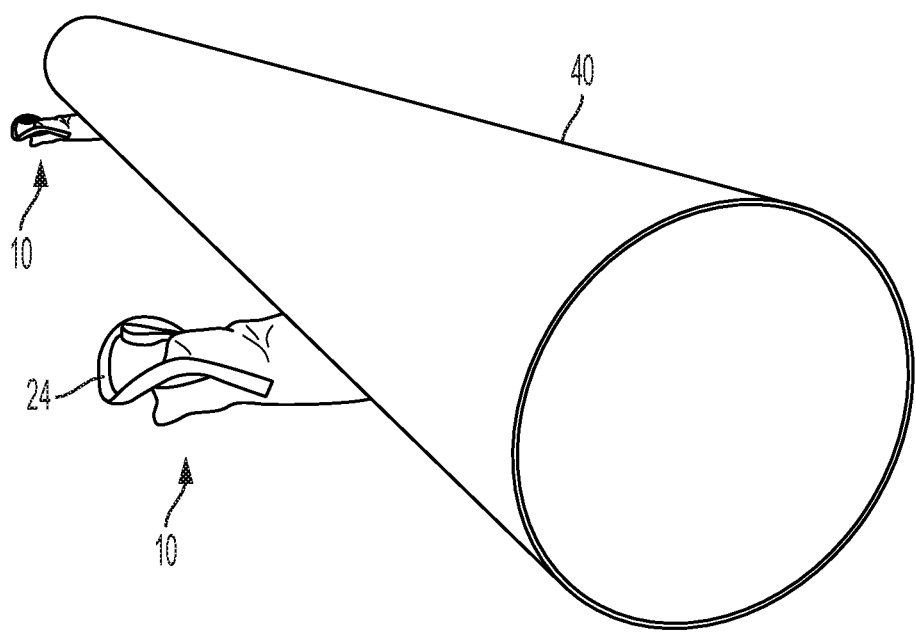
FIG. 6 illustrates a pair of the devices providing support protection and leveling of a pipeline section.

FIG. 6 illustrates a pair of devices 10 lowered into a trench and spaced apart in order to support a pipeline 40.

Figure 7:
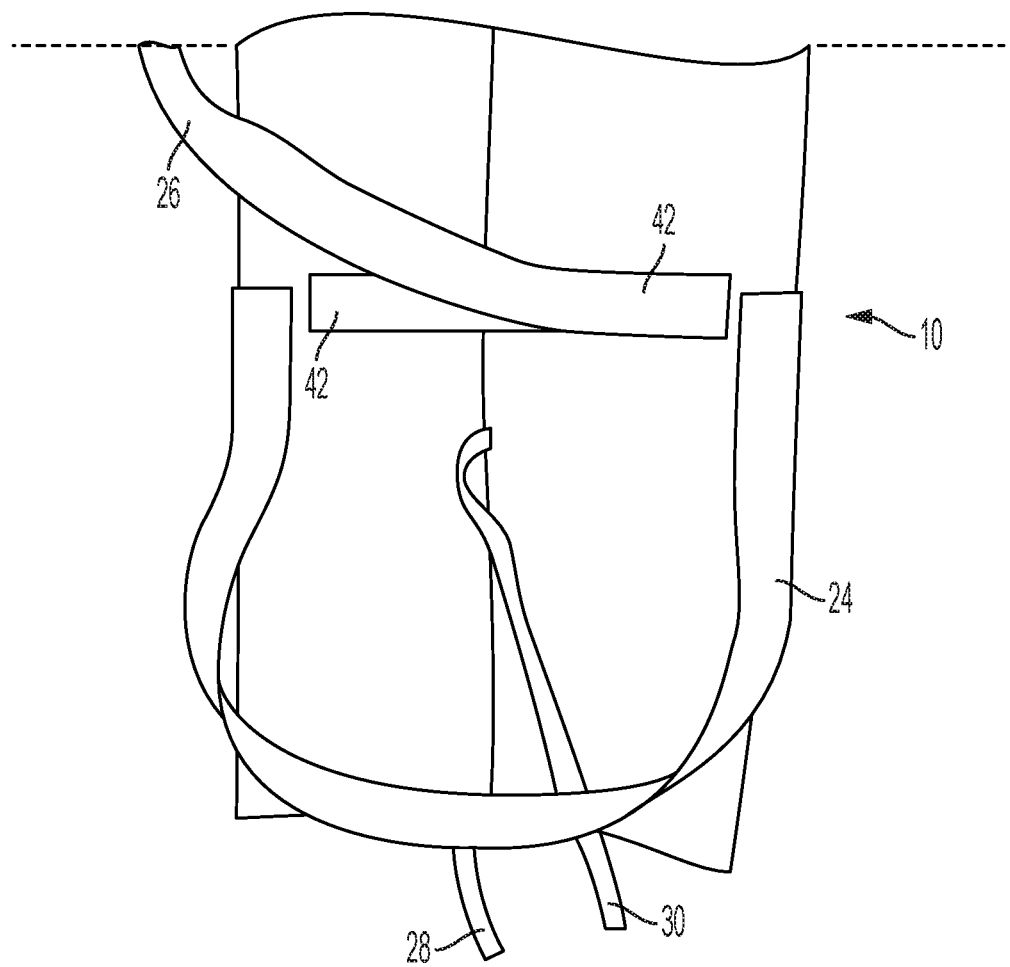
FIGS. 7 and 8 illustrate various views of the device prior to filling and closure of the open top.
Figure 8:
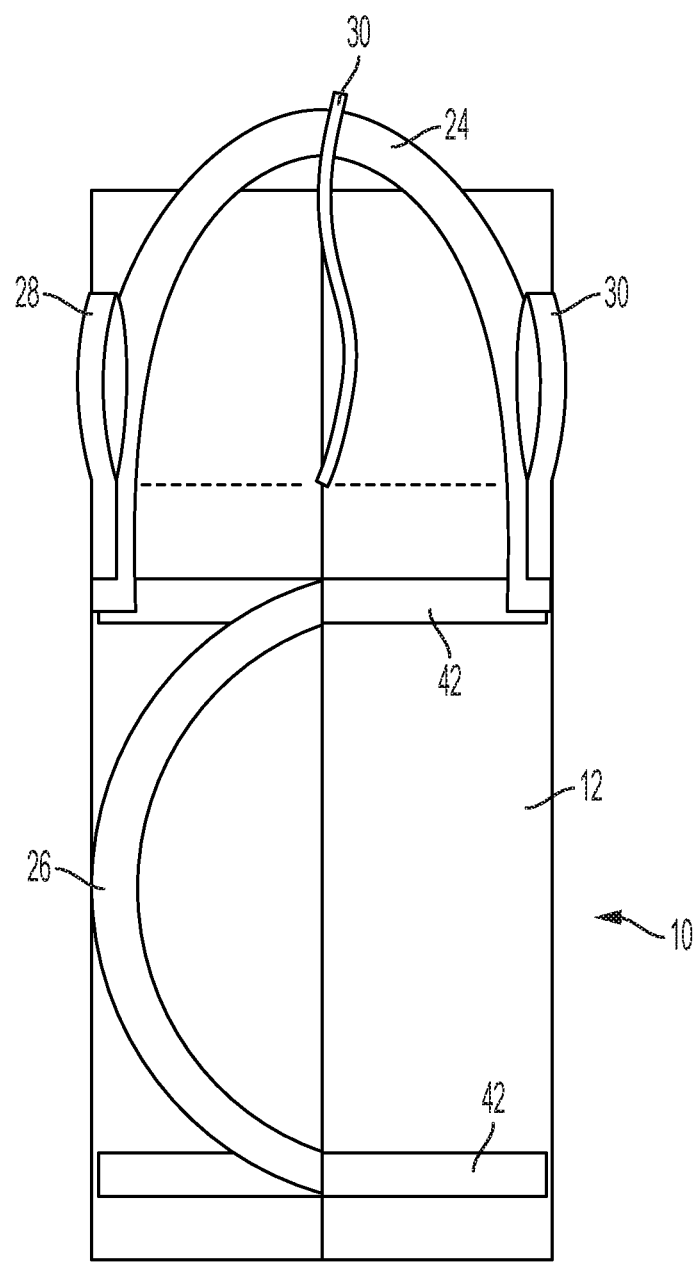

FIG. 7 illustrates a top view of a portion of the device and FIG. 8 illustrates the device 10 prior to filling and prior to closure of the open top. Each end of the side lift strap 26 is secured to the housing structure by cross-braces 42.

Figure 9:
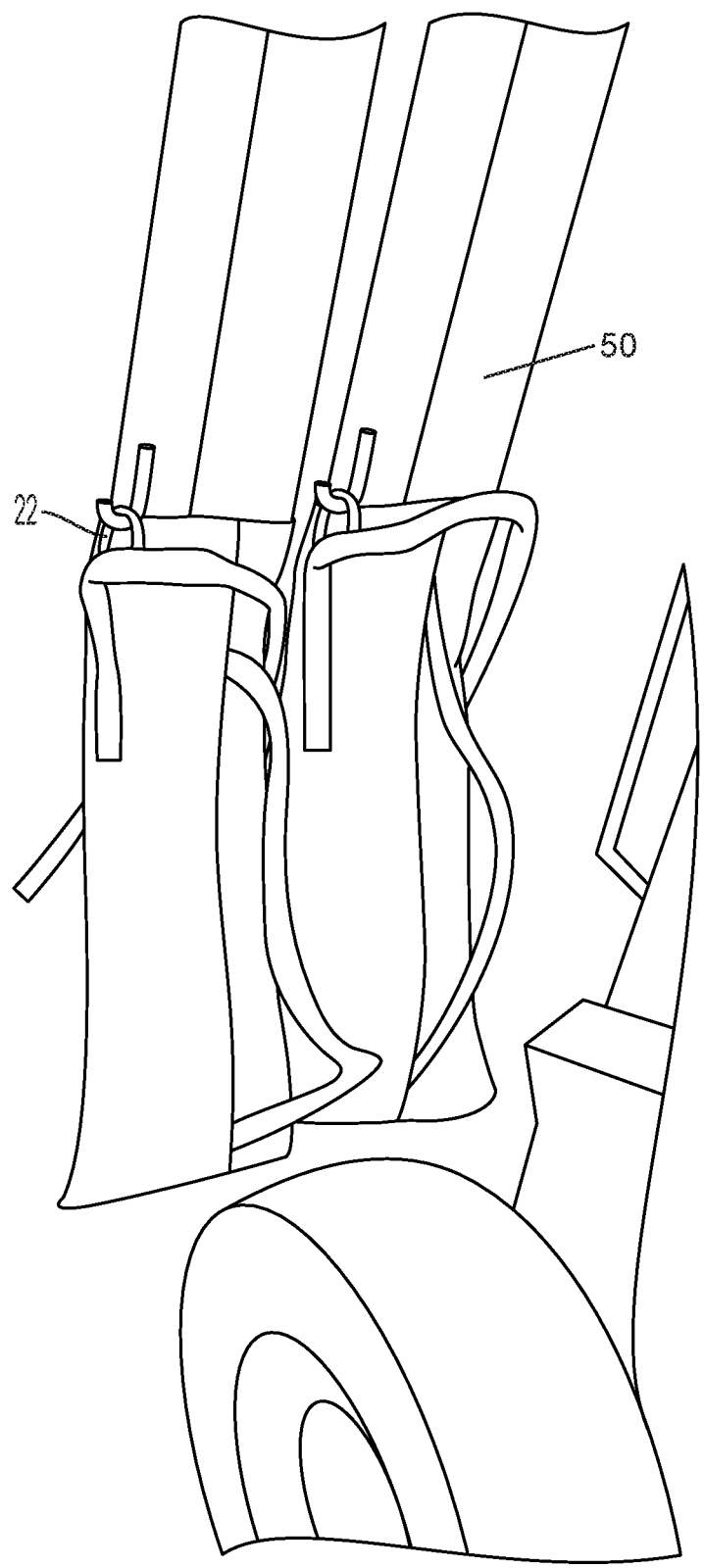
FIG. 9 is a perspective view of a pair of devices suspended from a filling frame during filling of the devices.

FIG. 9 illustrates a pair of devices 10 suspended from a filling frame 50. Hooks on the filling frame 50 engage the hook lift straps 22 so that filling material, such as sand, in the filling frame 50 will slide or fall into the open top of the device 10.

Whereas, the invention has been described in relation to the drawings attached hereto, it should be understood that other and further modifications, apart from those shown or suggested herein, may be made within the scope of this invention.

What is claimed is:

1. A pipeline protection and leveling process comprising the steps of:
   filling a permeable housing structure, that is substantially oval in cross-section, having a left side, a right side, a bottom and an open top with filling particles through said open top;
   closing said open top with a top opening closure mechanism by tying a pair of straps together to close said open top, where the pair of tying straps closes a top opening of the permeable housing structure by securing the top in place after the top of the permeable housing structure is rolled up;
   lifting said permeable housing structure and thereafter lowering said housing structure into a trench with a lifting mechanism connected to an upright strap, at least one side strap or at least one excavator hook strap attached to the housing structure; and
   resting a pipeline section on said permeable housing structure subsequent to lowering said housing structure into a trench.

2. The pipeline protection and leveling process as set forth in claim 1 including the additional step of making said permeable housing structure of woven polypropylene or other woven plastic.

3. The pipeline protection and leveling process as set forth in claim 1 including the additional step of positioning said at least one side strap horizontally perpendicular from the right side or the left side of the permeable housing structure.

4. The pipeline protection and leveling process as set forth in claim 1 including the additional step of positioning said upright strap along the top of the permeable housing structure.

5. The pipeline protection and leveling process as set forth in claim 1 including the additional step of positioning said at least one excavator hook strap adjacent either side along the top opening of the permeable housing structure.

* * * * *